H. CLIFFORD.
MILK-COOLER.
No. 188,341.   Patented March 13, 1877.
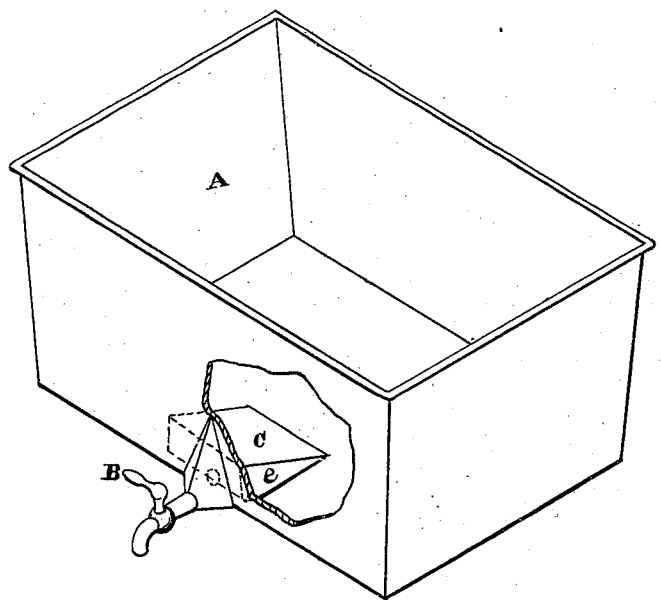
Witnesses
Geo. H. Strong.
Jno. L. Boone
Inventor
Hiram Clifford
by Dewey & Co
Attys

United States Patent Office.

HIRAM CLIFFORD, OF SAN FRANCISCO, CALIFORNIA.

IMPROVEMENT IN MILK-COOLERS.

Specification forming part of Letters Patent No. 188,341, dated March 13, 1877; application filed January 15, 1877.

*To all whom it may concern:*

Be it known that I, HIRAM CLIFFORD, of the city and county of San Francisco, State of California, have invented an Improved Method and Apparatus for Skimming Milk; and I do hereby declare the following description and accompanying drawings are sufficient to enable any person skilled in the art or science to which it most nearly appertains to make and use my said invention without further invention or experiment.

When cream is removed from the surface of milk by the usual method of skimming, either much of the cream is stirred into the milk again and rendered irrecoverable or a quantity of milk is taken up and mixed with the cream; and, besides this, much time and labor is required to collect the cream where the milk from a large number of cows is required to be skimmed daily.

My invention contemplates the separation of the cream from the milk by drawing off the milk from underneath the cream, so as to leave the cream in the vessel from which the milk was withdrawn. To do this properly I have discovered that a peculiar arrangement is required in order to prevent the cream from being mixed with the milk, all of which is described in the following specification.

Referring to the accompanying drawing, which is a perspective view of my invention, A is a tank, which may be of any desired or convenient size. I prefer to use a large or rather deep tank, and set the milk deep rather than shallow, as I have always obtained a larger proportion of cream in this way. At the bottom of the tank, on one side or end, as preferred, I attach a faucet or other draw-off cock, B. Now, if I should attempt to draw off the milk from underneath the cream by the use of this faucet alone, a downward current would be created inside of the tank, which would form a whirlpool in the milk, and the cream would be sucked downward, and either drawn through the faucet or be mixed with the milk—a result that would entirely defeat my object. To prevent this I place a shield, C, on the bottom of the tank, so that it will cover the port or faucet-passage. The particular form or size of this shield is immaterial, so long as it covers the port or passage and prevents the milk from entering it from above. I prefer to construct an inclined shield, as represented, one edge of which will bear against the side of the tank, above the port, while its opposite edge rests upon the bottom at a distance from the side. This shield has side pieces $e$, which also extend down to near the bottom, so that only a narrow space will be left beneath them. The milk will then be drawn under these side pieces, when the faucet is opened from opposite sides, and the suction will be lateral instead of vertical, thus preventing the formation of a current or whirlpool, but allowing the milk to be gradually withdrawn from under the cream, while the cream settles down upon it in an unbroken sheet.

As the cream will not pass through the narrow passage under the side pieces of the shield, all of the milk can be withdrawn and the cream left in the tank.

This arrangement will be quite convenient in large dairies, where a large quantity of milk must be skimmed daily, as one person can attend to a large number of tanks with but little trouble and no loss of cream.

Having thus described my invention, what I claim, and desire to secure by Letters Patent, is—

The tank A, provided with the faucet B, and having a shield, C, and side pieces $e$, which are so arranged as to admit the milk laterally from the bottom of the tank to the faucet, substantially as and for the purpose described.

In witness whereof I have hereunto set my hand.

HIRAM CLIFFORD.

Witnesses:
O. T. STACY,
F. A. BROOKS.